United States Patent [19]

Tomomura et al.

[11] Patent Number: 4,816,237

[45] Date of Patent: Mar. 28, 1989

[54] PROCESS FOR PURIFYING ARGON GAS AND APPARATUS USED THEREFOR

[75] Inventors: Masaomi Tomomura; Shunsuke Nogita, both of Hitachi; Kasuo Someya, Kudamatsu, all of Japan

[73] Assignee: Hitachi, Ltd., Tokyo, Japan

[21] Appl. No.: 14,127

[22] Filed: Feb. 5, 1987

Related U.S. Application Data

[63] Continuation-in-part of Ser. No. 760,625, Jul. 30, 1985, abandoned.

[30] Foreign Application Priority Data

Aug. 3, 1984 [JP] Japan .................. 59-162932

[51] Int. Cl.$^4$ .................. B01D 53/04; C01C 3/04; C01B 13/00
[52] U.S. Cl. .................. 423/210; 423/245.1; 423/247; 423/248; 423/219; 423/235; 423/262; 55/26; 55/66; 55/35; 55/75
[58] Field of Search .............. 423/245, 247, 248, 219, 423/235, 210, 262; 55/26, 66, 35, 75

[56] References Cited

U.S. PATENT DOCUMENTS

| | | | |
|---|---|---|---|
| 3,535,074 | 10/1970 | Nakashima | 423/219 |
| 3,715,572 | 2/1973 | Gramont et al. | 55/75 |
| 3,878,289 | 4/1975 | Beavon | 423/219 |
| 3,928,004 | 12/1975 | Bligh et al. | 55/66 |
| 4,257,885 | 3/1981 | Grose et al. | 55/75 |
| 4,505,880 | 3/1985 | Deschamps et al. | 423/219 |
| 4,515,605 | 5/1985 | Inoue et al. | 55/26 |

FOREIGN PATENT DOCUMENTS

154958 5/1982 German Democratic Rep. .................. 423/219

*Primary Examiner*—W. J. Shine
*Assistant Examiner*—Chung K. Pak
*Attorney, Agent, or Firm*—Fay, Sharpe, Beall, Fagan, Minnich & McKee

[57] ABSTRACT

Highly pure argon is obtained from an argon waste gas composition by adding a stoichiometrically excess amount of oxygen to the waste gas composition to combust hydrogen and the like impurities and to convert into water and carbon dioxide, adding a stoichiometrically excess amount of a hydrocarbon gas to the resulting gas composition to remove the residual oxygen by the reaction with the oxygen and the hydrocarbon gas so as to convert into water and carbon dioxide, and subjecting the resulting gas composition to a pressure swing adsorption-desorption treatment to remove the impurities.

9 Claims, 3 Drawing Sheets

PROCESS FOR PURIFYING ARGON GAS AND APPARATUS USED THEREFOR

RELATED APPLICATIONS

This is a continuation-in-part of U.S. patent application Ser. No. 760,625 filed July 30, 1985, now abandoned.

BACKGROUND OF THE INVENTION

This invention relates to a process for purifying argon gas in a waste gas and an apparatus used therefor.

In order to purify argon from a waste gas, since combustible constituents contained in the waste gas are combusted with oxygen, the waste gas is contaminated with a large amount of residual oxygen. In this case, separation of oxygen and argon has been disadvantageous in that since their boiling points are as similar as $-182.97°$ C. and $-186.0°$ C. (atmospheric pressure), respectively, a large rectifying tower is necessary for separating them by reactification.

A silicon furnace is a furnace used for producing silicon by withdrawing single crystal silicon from melted crude silicon with the aid of a seed, and for the production, argon is used as atmosphere gas.

Argon is contained in a high concentration of 96 to 98% in a waste gas composition exhausted from the silicon furnace, and is reused after being purified and recovered from said gas composition because argon is expensive.

As such a process for purifying argon, there is disclosed, for example, a process which, as shown in Japanese Patent Appln Kokai (Laid-Open) No. 72,394/77, comprises passing impurities in argon such as carbon monoxide, hydrogen, tritium, carbon dioxide, nitrogen, oxygen, methane and acetylene through a first reaction tube packed with a metal catalyst such as palladium, platinum or the like to react oxygen with impurities among them which are active toward oxygen, adding, to the gas which has come out of the first reaction tube, hydrogen in an amount excessive over the amount of oxygen in said gas, passing the resulting gas through a second reaction tube to effect reaction between the oxygen and hydrogen in the gas, passing the gas through an adsorption tower to remove the water and carbon dioxide in the gas by adsorption, and then passing the residue through a low-temperature liquefaction separation tower to purify and separate the same into hydrogen, nitrogen and argon.

Such a purification process is disadvantageous in that the constitution of apparatus is complicated because since said process requires subzero treatment at about $-200°$ C., there are conducted, as pretreatments, removal of hydrocarbons such as methane, acetylene and the like, removal of water and carbon dioxide for preventing their condensation and solidification in the pipes of an apparatus for subzero treatment, and removal of oxygen similar to argon in boiling point for improving the efficiency of argon recovery.

Further, there is disclosed a process which, as shown in Japanese Patent Publication No. 28,750/77, comprises passing impurities in argon such as carbon monoxide, carbon dioxide and oxygen through a combustor to combust carbon monoxide with oxygen into carbon dioxide, then carrying out subzero treatment at about $-100°$ C., thereby separating the carbon dioxide to purify and separate argon gas.

Since this process is intended for an argon-oxygen decarbonization hearth, the presence of oxygen in the recovered gas is allowed up to about 30%, so that removal of oxygen is not particularly necessary. However, this process is disadvantageous in that nitrogen and water should be removed and that removal of carbon dioxide requires subzero treatment at about $-100°$ C., so that the apparatus becomes complicated.

On the other hand, removal of oxygen by addition of hydrogen is disclosed, for example, in U.S. Pat. Nos. 3,535,074 and 4,299,800 and East German Pat. No. 154,958; removal of hydrocarbons is disclosed, for example, in U.S. Pat. Nos. 3,717,572; 4,025,321; and 4,257,885, removal of oxygen by addition of hydrocarbons is disclosed, e.g., in U.S. Pat. Nos. 3,878,289; 4,156,461; and 4,505,880, removal of trace oxygen with heating is disclosed, for example, in U.S. Pat. No. 3,996,028, and removal of hydrogen by addition of oxygen is disclosed, for example, in U.S. Pat. No. 4,459,270. But these references show only special steps for attaining their objects and are quite silent on combinations of these steps.

SUMMARY OF THE INVENTION

An object of this invention is to provide a process for purifying an argon waste gas containing small amounts of hydrogen ($H_2$), carbon monoxide (CO), hydrocarbons, nitrogen ($N_2$), oxygen ($O_2$), etc., by an adsorption method, for example, a pressure swing adsorption-desorption method wherein hydrogen and oxygen which cannot be sufficiently removed by a gas adsorption method at room temperature are previously removed, and the argon gas can be purified economically and industrially. Another object of this invention is to provide an apparatus used therefor.

This invention provides a process for producing a highly purified argon gas from an argon waste gas containing $H_2$, CO, $N_2$, $O_2$ and hydrocarbons as impurities, which comprises the steps of;

(a) adding an oxygen gas to said argon waste gas in a stoichiometrically excess amount with respect to said $H_2$, CO and hydrocarbons;

(b) contacting said waste gas incorporated with $O_2$ gas with a catalyst for oxidation reaction between $H_2$, CO and hydrocarbons and $O_2$ to convert $H_2$, CO and hydrocarbons into $H_2O$, and $CO_2$ so that respective amounts of $H_2$, CO and hydrocarbons in the treated gas are reduced to be less than 1 ppm by weight;

(c) adding a $C_nH_{2n+2}(n=1\sim4)$ gas to said treated gas in a stoichiometrically excess amount with respect to $O_2$ contained in said treated gas;

(d) contacting said treated gas incorporated with said $C_nH_{2n+2}$ gas with a catalyst for oxidation reaction between $C_nH_{2n+2}$ and $O_2$ to convert $C_2H_{2n}$ into $CO_2$ and $H_2O$ so that an amount of $O_2$ in the treated gas is reduced to be less than 1 ppm by weight; and (e) subjecting the treated gas containing the $C_nH_{2n+2}$ gas as an impurity to a pressure swing adsorption-desorption method in order to remove $N_2$, $C_nH_{2n+2}$, $CO_2$ and $H_2O$ from the treated gas, thereby to produce the highly purified argon gas of a concentration of 99.99% by weight or more;

said pressure swing adsorption-desorption method comprising (1) a first step of introducing said treated gas containing the $C_nH_{2n+2}$ gas into a first adsorption bed packed with an adsorbent selected from the group consisting of zeolite 5A mordenite and a mixture thereof, each having an average micropore size of 5 angstroms under an elevated pressure at an ambient temperature, while a second adsorption bed packed with the adsorbent is in the stage of regeneration;

(2) a second step of effecting desorption of the adsorbent in said first adsorption bed by reducing the pressure thereof at the ambient temperature, while the second adsorption bed is in the stage of adsorption;

(3) a third step of regenerating the adsorbent in said first adsorption bed by letting the highly purified argon gas pass said first adsorption bed under the reduced pressure at the ambient temperature, while said second adsorption bed is in the stage of desorption; and (4) a fourth step of effecting adsorption in the first adsorption bed by contacting said treated gas containing the $C_nH_{2n+2}$ gas with said adsorbent under the same condition as in step (1), while said second adsorption bed is in the stage of regeneration.

This invention also provides an apparatus used for such a process.

DETAILED DESCRIPTION OF THE PREFERRED EMBODIMENTS

The gist of this invention is based on an idea that in a process and an apparatus for purifying argon from a waste gas composition for purifying argon from a waste gas composition comprising argon gas containing small amounts of $H_2$, CO, $N_2$, $O_2$ hydrocarbons, etc., as impurities, the purification is conducted by adding oxygen to said gas composition in a soichiometrically excess amount with respect to said $H_2$, CO and hydrocarbons, combusting the $H_2$, CO and hydrocarbons by catalytic reaction to remove the same and to carry out conversion into water ($H_2O$) and carbon dioxide ($CO_2$), adding a hydrocarbon ($C_nH_{2n+2}$) to the residual oxygen, thereby converting the residual oxygen into water and carbon dioxide, thereafter separating impurities from the gas composition by a pressure swing adsorption-desorption method, and concentrating argon.

That is to say, as to a process for recovering argon, for example, from a waste gas composition comprising argon as its main constituent, carbon monoxide, hydrogen, hdrocarbons, nitrogen, oxygen and the like, this invention provides a process for purifying argon which comprises a step (a) of adding oxygen in a soichiometrically excess amount with respect to said $H_2$, CO, and hydrocarbons in the aforesaid waste gas; a step (b) of bringing said gas into contact with a catalyst, and thereby combusting the $H_2$, CO and hydrocarbons; a step (c) of adding a hydrocarbon ($C_nH_{2n+2}$) to the gas composition which has gone through said steps (a) and (b); a step (d) of bringing the resulting gas into contact with a catalyst, and thereby removing the oxygen; and a step (e) of absorbing, on an adsorbent containing silica and alumina as major components, e.g., zeolite 5A having an average micropore size of 5 Å, mordenite having an average micropore size of 5 Å, zeolite 13× having an average micropore size of 9–10 Å, or a mixture thereof, the constituents other than argon of the gas composition which has gone through said steps (c) and (d), and thereby concentrating and purifying argon.

Here, it is preferable to carry out the step (b) while maintaining the space velocity of the waste gas composition at 15,000 $h^{-1}$ or below and the combustion temperature (catalyst layer temperature) at 600° C. or below and carry out the step (d) while maintaining the space velocity of the gas composition at 15,000 $h^{-1}$ or below and the combustion temperature (catalyst layer temperature) at 500° to 600° C.

Figure 1:
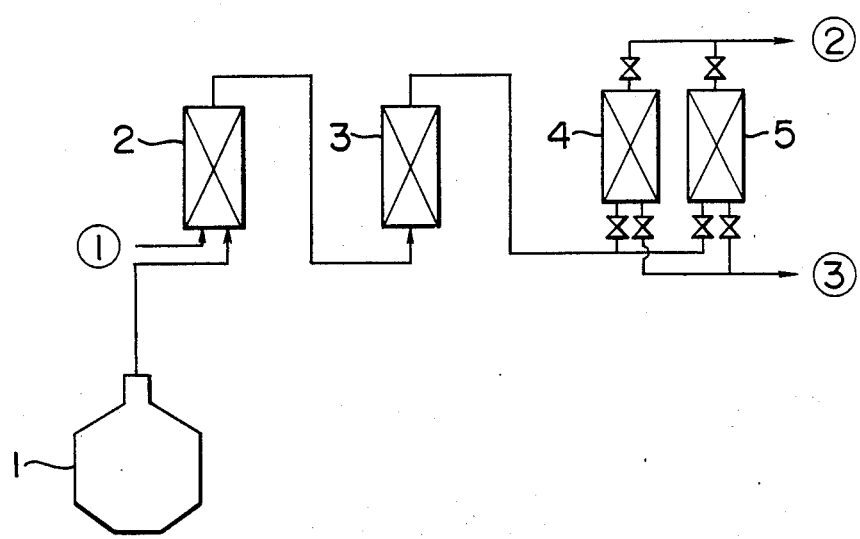
FIG. 1 is a schematic flow chart for purification of argon from a waste gas composition according to this invention.

This invention is explained more in detail below referring to the drawings. FIG. 1 is a schematic flow chart of the purification of argon from a waste gas composition comprising argon gas containing small amounts of $H_2$, CO, hydrocarbons, $N_2$, $O_2$, etc., as impurities in this invention.

Numeral 1 denotes a silicon furnace or the like. The purification comprises steps of adding oxygen to a waste gas composition exhaused from the silicon furnace in a stoichiometrically excess amount with respect to said $H_2$, CO and hydrocarbons, combusting the $H_2$, CO and hydrocarbon to remove the same in a catalytic combustor 2, adding hydrocarbon gas ($C_nH_{2n+2}$) (n=1~4) to the residual oxygen exhausted from the catalytic combustor 2 in an amount of more than the equivalent to the oxygen, removing the oxygen in a catalytic combustor 3, and then subjecting the gas composition containing $N_2$, hydrocarbons, $CO_2$, $H_2O$, etc. and exhausted from the catalytic combustor 3 to adsorption-desorption cycle by adsorption towers 4 and 5. In FIG. 1, ① indicates addition of oxygen, ② exhaust of argon gas, and ③ exhaust of water, $N_2$, carbon dioxide, hydrocarbons, and the like. Numerals 4 and 5 denote adsorption towers in which adsorption and desorption are cyclicly repeated. In FIG. 1, the tower 4 functions as an adsorption tower and the tower 5 as a desorption tower. As to the kind of the adsorption-desorption, there may be employed not only a so-called "pressure swing adsorption-desorption method" but also a so-called "temperature swing adsorption-desorption method".

Figure 2:
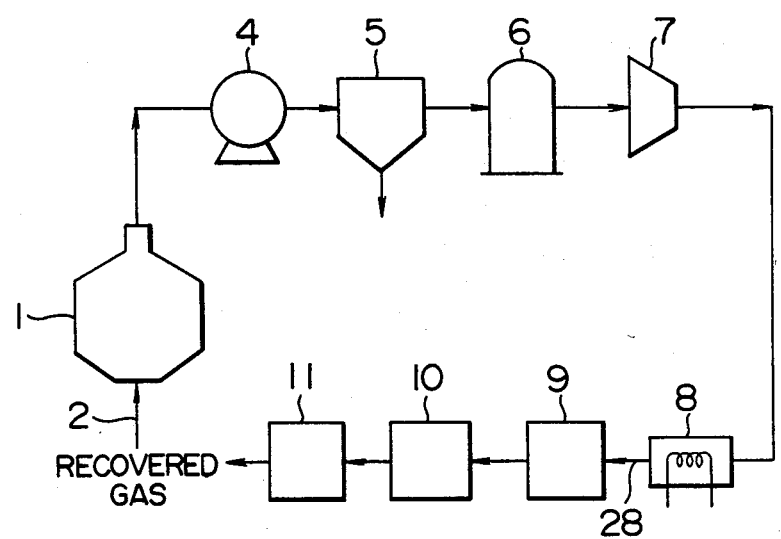
FIG. 2 is a block diagram of a process of purifying and recovering argon from a waste gas composition exhausted from a silicon furnace or the like, FIG. 3 is a flow diagram showing one example of the process and apparatus for purifying argon of this invention.

FIG. 2 is a block diagram of a process of purifying and recovering argon from a waste gas composition exhausted from a silicon furnace in this invention.

Numeral 1 denotes a silicon furnace, and argon is blow thereinto through a pipe 6 connected to the bottom of the silicon furnace 1. A waste gas composition 3 exhausted from said silicon furnace 1 is introduced by a vacuum pump 7 into an oil fume separator 8. The waste gas composition is freed from oil in the oil fume separator 8 and then stored in a cushion tank 9. Subsequently, the waste gas composition which has passed through said cushion tank 9 is sent by a compressor 10 via a heater 11 successively to catalytic combustors 12 and 13 and an adsorption tower 14. In a process and an apparatus for purifying argon which permit purification and recovery of argon alone, the constitutents other than argon are substantially removed, and the purified argon can be supplied through the pipe 6 to the silicon furnace 1.

Figure 3:
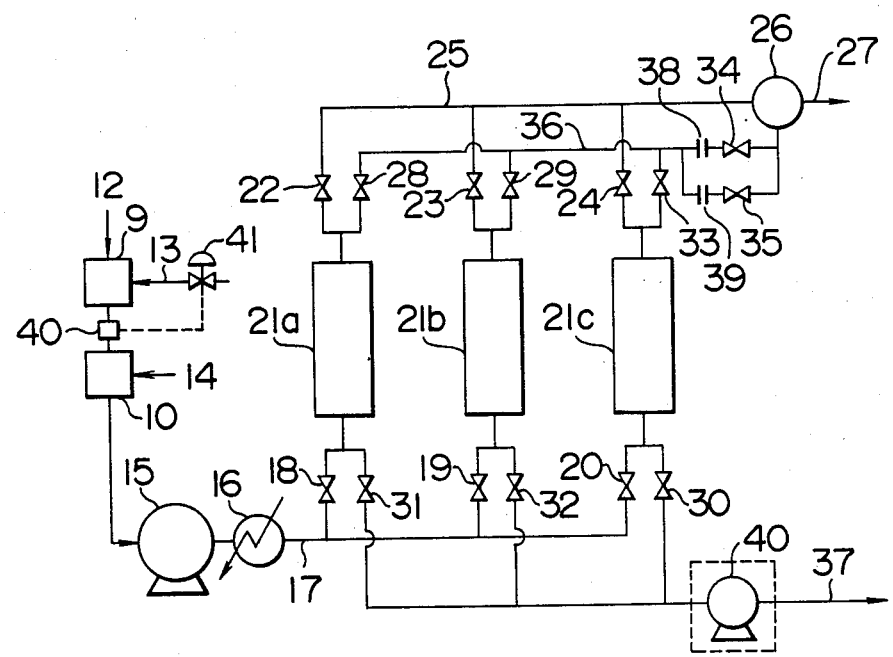

FIG. 3 is a flow diagram further showing one example of the above-mentioned process and apparatus for purifying argon. In FIG. 3, numeral 12 denotes a pipe connected to the heater 11 shown in FIG. 2, and the waste gas composition which has passed through the heater 8 is introduced through the pipe 12 into the catalytic combustors 9 and 10. In the catalytic combustor 9, the $H_2$, CO and hydrocarbons in the waste gas composition is selectively combusted by the action of a catalyst. As oxygen necessary for this combustion reaction, there is used, besides oxygen contained in said gas composition, oxygen supplied through an oxygen supply pipe 13 by operating a valve 41 so that the amount of oxygen becomes stoichiometrically excess with respect to the hydrogen, CO and hydrocarbons in said gas composition, namely, an oxygen meter 40 always indicates an excess of oxygen. When oxygen is previously contained in said gas composition in an amount of more than the equivalent to the $H_2$, CO and hydrocarbons, the line consisting of the oxygen meter 40, the oxygen supply pipe 13 and the valve 41 can be omitted. The steps so far described correspond to the steps (a) and (b). Next, in the catalytic combustor 10 where the step (d) is carried out, the residual oxygen in the waste gas composition which has passed through the step (b) is remvoved by adding a hydrocarbon ($C_nH_{2n+2}$) gas and bringing the resulting gas into contact with a catalyst to react the same. The hydrocarbon necessary for the reaction is supplied from a supply pipe 14.

The waste gas composition subjected to the catalytic combustion is pressurized by a compressor 15, and the heat produced by the compression is liberated by a cooler 16. The thus pressurized waste gas composition is sent through a pipe 17 to the step (e) and introduced under pressure through a solenoid valve 18, 19 or 20 into an adsorption tower 21a, 21b or 21c, respectively. The concentrated argon freed from impurities by pressurization-adsorption treatment in these adsorption towers 21a through 21c is sent through a solenoid valve 22, 23 or 24 and a pipe 25 to a product gas tank 26 and stored therein. Accordingly, the concentrated argon gas can be taken out through a pipe 27 at any time.

This invention, as described above, comprises the steps (a) through (e), and is characterized in that before the step (e), the residual oxygen in the waste gas composition is previously removed by reacting the same with a hydrocarbon in the presence of a catalyst, and the residue is subjected to the subsequent pressure swing adsorption-desorption treatment. The reason for the previous removal of the oxygen is that oxygen is similar to argon in chemical properties and hence is difficult to separate from argon by the pressure swing adsorption.

Next, the catalysts used in the steps (b) and (d) are explained below.

As the catalyst used for the combustion of hydrogen, carbon monoxide and hydrocarbons with oxygen, platinum-alumina, palladium and alumina and the like are thought of, but platinum is not preferable because in a system in which hydrogen and carbon monoxide coexist, platinum is seriously attacked by carbon monoxide. On the other hand, palladium is suitable as a catalyst for a system in which hydrogen and carbon monoxide coexist, because it is less lowered in activity by carbon monoxide as compared with platinum. In this invention, as the catalyst used in the catalytic combustors, palladium-alumina catalyst is used.

Although palladium and alumina are suitable as the catalyst as in the above, platinum may be used in the present step because the waste gas composition in this step contains no CO. On the other hand, the adsorption towers in the step (e) are packed with a zeolite series or mordenite series adsorbent or the like which selectively adsorbs hydrocarbons, carbon dioxide, nitrogen, water and the like in preference to argon. Examples of such adsorbents are zeolite 5A having an average micropore size of about 5 Å, synthesized mordenite having an average micropore size of about 5 Å, and zeolite 13× having an average micropore size of 9−10 Å, or a mixture thereof. The separation quality of argon and other adsorbed components of these adsorbents is shown in Table 1.

TABLE 1

|  | Separation quality |
|---|---|
| Zeolite 5A | ⊚ (very good) |
| Synthesized mordenite | ○ (good) |
| Zeolite 13X | Δ (not so good) |

As shown in Table 1, the use of zeolite 5A is preferble.

Although the adsorption pressure and temperature for such selective adsorption depends on the capacity of the adsorbent, an adsorption pressure of several atmospheres, in particular, 1 to 5 atmospheres in terms of gauge pressure is sufficient.

As the hydrocarbon ($C_nH_{2n+2}$) used in the step (d), there can be used alkanes such as methane, ethane, propane, butane, etc., alone or as a mixture thereof, so long as no trouble is caused in the adsorption step.

Next, the adsorption procedure cycle by the pressure swing adsorption-desorption method in the step (e) is explained below.

The adsorption procedure cycle is usuallycarried out by using, as shown in FIG. 3, a set of three adsorption towers and comprises the six procedures shown in Table 2. In each of the adsorption 21a through 21c, there is conducted an adsorption treatment consisting of five stages, namely, pressure equalization, pressurization, adsorption, desorption and purge, and in these procedures, the respective operations described below are conducted.

TABLE 2

| Adsorption tower | Operation | | | | | |
|---|---|---|---|---|---|---|
|  | 1 | 2 | 3 | 4 | 5 | 6 |
| 21a | Adsorption Pressure equalization | Adsorption | Desorption | Purge | Pressure equalization | Desorption |
| 21b | Pressure equalization | Pressurization | Adsorption Pressure equalization | Adsorption | Desorption | Purge |
| 21c | Desorption | Purge | Pressure equalization | Pressurization | Pessure equalization | Adsorption |

| Adsorption | Operation | | | | | |
|---|---|---|---|---|---|---|
| tower | 1 | 2 | 3 | 4 | 5 | 6 |
| | | | | | Adsorption | |

TABLE 2-continued

Pressure equalization stage: Into an adsorption tower having an internal pressure of atmospheric pressure in which the adsorbent has been regenerated by purge, a part of argon concentrated in another tower in the adsorption stage in introduced, so that the pressure inside the adsorption tower is equalized. By virtue of this procedure, the gas composition to be subjected to the subsequent pressurization or adsorption stage is richer in argon than the original waste gas composition, so that the degree of concentration and yield of recovered argon can be improved.

Pressurization stage: The waste gas composition which has been subjected to combustion treatment is introduced under pressure into the tower having an equalized inner pressure until a desired adsorption pressure is reached.

Desorption stage: The pressure inside the tower is reduced to atmospheric pressure, and carbon monoxide, carbon dioxide, nitrogen and water all adsorbed in the preceding stage are exhausted. It is effective to conduct the operation in the tower inside which the pressure is reduced to atmospheric pressure or below.

Purge stage: Into the tower having an internal pressure of atmospheric pressure, a part of concentrated argon in another tower in adsorption stge is introduced from the top of the former tower, and it washes the adsorbent to regenerate the same and is then purged from the bottom of the tower.

Next, the steps of procedure for operation of the adsorption towers shown in FIG. 3 is described in the concrete example with reference to Table 2.

In the first procedure, the adsorption towers 21a, 21b and 21c reach the adsorption (21a), pressure equalization (21b) and desorption (21c) stages, respectively. At this time, the solenoid valves 22, 28, 29 and 30 are opened, while the solenoid valves 18, 31, 19, 32 23, 20, 24, 33, 34 and 35 are closed. By this operation of the valves, carbon moxoxide, carbon dioxide, nitrogen and water are adsorbed on an adsorbent from a waste gas composition in the adsorption tower 21a, and the residual argon passes through the solenoid valve 22 and a pipe 25 and enters the product gas tank 26.

On the other hand, the adsorption tower 21b is in the pressure equalization stage, and concentrated argon is introduced into the adsorption tower 21b *from the adsorption tower 21a* through the solenoid valve 28, a pipe 36 and the solenoid valve 29. Further, in the adsorption tower 21c in the desorption stage, impurity constituents in the waste gas composition which have been adsorbed in the preceding stage are exhausted through the solenoid valve 30 and a gas-exhausting pipe 37, and with the exhaust, the pressure inside the tower is lowered.

In the second procedure, the adsorption tower 21a is still in the adsorption stage, and the adsorption towers 21b and 21c reach the pressurization stage and the purge stage, respectively. At this time, the solenoid valves 22, 28, 19, 30 and 33 are opened, while the solenoid valves 18, 31, 32, 23, 29, 20 and 24 are closed. By this operation of the valves, the waste gas composition is supplied to the adsorption tower 21b subjected to pressure equalization in the preceding procedure through a compressor 15, a cooler 16, a gas-introducing pipe and the solenoid valve 19 and is then pressurized. Further, into the adsorption tower 21c which has reached the purge stage, concentrated argon is introduced from the adsorption tower 21a through the solenoid valve 28, a pipe 36 and the solenoid valve 33, whereby the adsorbent is regenerated.

The purge gas after the regeneration treatment is exhausted outside the system through the solenoid valve 30 and the pipe 37.

In the third procedure, the adsorption towers 21a, 21b and 21c reach the desorption, adsorption and pressure equalization stages, respectively. At this time, the solenoid valves 31, 23, 29 and 33 are opened, while the solenoid valves 18, 22, 28, 19, 32, 20 and 30 are closed. By this operation of the valves, in the adsorption tower 21a, the impurity constituents in the waste gas composition which have been adsorbed in the preceding stage are exhausted through the solenoid valve 31 and the gas-exhausting pipe 37, and with the exhaust, the pressure inside the tower is lowered. The adsorption tower 21b reaches the adsorption stage, and in this tower, carbon monoxide, carbon dioxide, nitrogen and water are adsorbed on an adsorbent from the waste gas composition, and the residual argon passes through the solenoid valve 23 and the pipe 25 and enters the product gas tank 26. On the other hand, the adsorption tower 21c is in the pressure equalization stage, and concentrated argon is introduced into the tower 21c from the adsorption tower 21b through the solenoid valve 29, the pipe 36 and the solenoid valve 33.

In the fourth procedure, in the same manner as described above, the adsorption towers 21a, 21b and 21c are operated for the purge, adsorption and pressurization stages, respectively. At this time, among the solenoid valves, the valves 31, 28, 23, 29 and 20 are opened, while the valves 18, 22, 19, 32, 30 and 24 are closed.

In the fifth procedure, the adsorption towers 21a and 21b are operated for the pressure equalization stage and the desorption stage, respectively, and the adsorption tower 21c is operated for the adsorption stage. At this time, the solenoid valves 28, 32, 24 and 33 are opened, while the solenoid valves 18, 31, 22, 19, 23, 29, 20 and 30 are closed.

In the sixth procedure, the adsorption towers 21a, 21b and 21c are operated for the pressurization, purge and adsorption stages, respectively. At this time, among the solenoid valves, the valves 18, 32, 29, 24 and 33 are opened, while the valves 31, 22, 28, 19, 23, 20 and 30 are closed.

Although, in the above explanation, the concentrated argon introduced into the towers in the pressure equalization stage or the purge stage is supplied from the adsorption tower in the adsorption stage, it can also be supplied from the product gas tank through the solenoid valves 34 and 35. In FIG. 3, numeral 38 and 39 are throttle valves.

Further, this invention makes it possible to desorb the adsorbed gas constituents which are impurities by equipping, as shown in FIG. 3, the pipe 37 with a vacuum pump 40 or the like as a vacuum-producing device and reducing the pressure inside the tower. According to this method, the adsorbent can be effectively regenerated, therefore the above-mentioned purge stage can be omitted, and moreover this method is effective for improving the recovery of argon.

The above explanation is given taking the case of a set of three adsorption towers, but in this invention, the number of adsorption towers is not critical and FIG. 2 and FIG. 3 merely shown one example of embodiments.

This invention is explained below with reference to further examples.

Argon was purified from a waste gas composition exhausted from a silicon furnace, by means of the apparatus shown in FIG. 3 which is used for the method of this invention. Since this invention is characterized by using an adsorption-desorption method in the step (e), a brief description of the adsorption-desorption cycle is given below.

In the case of the pressure swing adsorption-desorption, said method comprises the following procedure cycle.

That is to say, the following procedure are carried out in a cycle:

an adsorption procedure comprising opening the top of the tower 21a, introducing a product gas into a product tank, and adsorbing constituents of the composition other than argon under pressure in the tower 21a, a pressure equalization procedure comprising opening a valve of the tower 21c having an internal pressure of atmospheric pressure in which the purge step has been completed, thereby connecting the tops of the towers 21a and 21c to each other, and sending argon of high purity in the tower 21a having a high internal pressure to the tower 21c, a desorption procedure comprising opening a valve at the bottom of the tower 21a and thereby exhausting the impurity constituents in the adsorption tower 21a outside this tower, a purge procedure comprising feeding a part of product gas from the tower 21b which is in the adsorption step into the tower 21a through its upper part, exhausting the same from the bottom of the tower 21a, and thereby washing out the impurity constituents remaining in the tower 21a to regenerate the adsorbent, and a pressure equalization procedure comprising opening a valve of the tower 21b in which the adsorption step has been completed, thereby connecting the tops of the towers 21a and 21b to each other, and sending argon of high purity in the tower 21b to the tower 21a. The same procedures as these are carried out also in the towers 21b and 21c.

These steps can be summarized as follows:

(1) a first step of introducing said treated gas containing the $C_nH_{2n+2}$ gas into a first adsorption bed packed with an adsorbent selected from the group consisting of zeolite 5A, mordenite and a mixture thereof, each having an average micropore size of 5 angstroms under an elevated pressure at an ambient temperature, while a second adsorption bed packed with the adsorbent is in the stage of regeneration;

(2) a second step of effecting desorption of the adsorbent in said first adsorption bed by reducing the pressure thereof at the ambient temperature, while at the second adsorption bed in in the stage of adsorption;

(3) a third step of regenerating the adsorbent in said first adsorption bed by letting the highly purified argon gas pass said first adsorption bed under the reduced pressure at the ambient temperature, while said second adsorption bed is in the stage of desorption; and (4) a fourth step of effecting adsorption in the first adsorption bed by contacting said treated gas containing the $C_nH_{2n+2}$ gas with said adsorbent under the same condition as in step (1), while said second adsorption bed is in the stage of regeneration; or alternatively (1) a first step of introducing said treated gas containing the $C_nH_{2n+2}$ gas into a first adsorption bed packed with an adsorbent selected from the group consisting of zeolite 5A, mordenite and a mixture thereof each having an average micropore size of 5 angstroms under an elevated pressure at an ambient temperature, while a second adsorption bed packed with the adsorbent is in the stage of desorption and a third adsorption bed packed with the adsorbent is in the stage of regeneration;

(2) a second step of effecting desorption of the adsorbent in said first adsorption bed by reducing the pressure thereof at the ambient temperature, while the second adsorption bed is in the stage of regeneration and the third adsorption bed is in the stage of adsorption; and (3) a third step of regenerating the adsorbent in said first adsorption bed by letting the highly purified argon gas pass said first adsorption bed under the reduced pressure at the ambient temperature, while the second adsorption bed is in the stage of adsorption and the third adsorption bed is in the stage of desorption, said first to third steps being repeated cyclically.

In the case of the temperature swing adsorption-desorption, said method comprises repeating the following steps in sequence:

an adsorption step comprising introducing under pressure a gas from a combustion treatment step into a plurality of adsorption towers packed with an adsorbent until the temperature reaches 5° to 30° C., adsorbing, under pressure, constituents capable of being adsorbed other than argon on the adsorbent from said gas, and taking out a purified gas in which argon has been concentrated an ordinary-temperature desorption step comprising reducing the pressure inside the adsorption tower and thereby exhausting the adsorbed constituents outside the system, a high-temperature desorption step comprising heating a part of the aforesaid purified gas to 200° to 300° C., then feeding the same into the adsorption tower in which said desorption step has been completed from the top of the tower, exhausting the residual adsorbed constituents from the bottom of the tower, and thereby regenerating the adsorbent, and a cooling step comprising cooling the tower having a high temperature to ordinary temperature.

Still further examples of this invention are explained below.

Argon was concentrated and purified from a waste gas composition exhausted from a silicon furnace, by means of the apparatus shown in FIG. 3. The gas constituents of the waste gas composition were as shown in Table 3. The combustor 9 in the step (b) was packed with palladium-alumina catalyst, and this step was carried out at various space velocities of the waste gas composition of 1,000 to 20,000 $h^{-1}$ and various combustion temperatures of 20° to 600° C.

TABLE 3

| | (% by weight) | | | | | | |
|---|---|---|---|---|---|---|---|
| | Ar | Co | CH$_4$ | N$_2$ | O$_2$ | H$_2$ | H$_2$O |
| Composition | 96.3 | 0.1 | 0.5 | 1 | 2 | 0.1 | Saturated |

TABLE 3-continued

| | (% by weight) | | | | | |
|---|---|---|---|---|---|---|
| | Ar | Co | $CH_4$ | $N_2$ | $O_2$ | $H_2$ | $H_2O$ |
| of waste gas | | | | | | |

Figure 4:
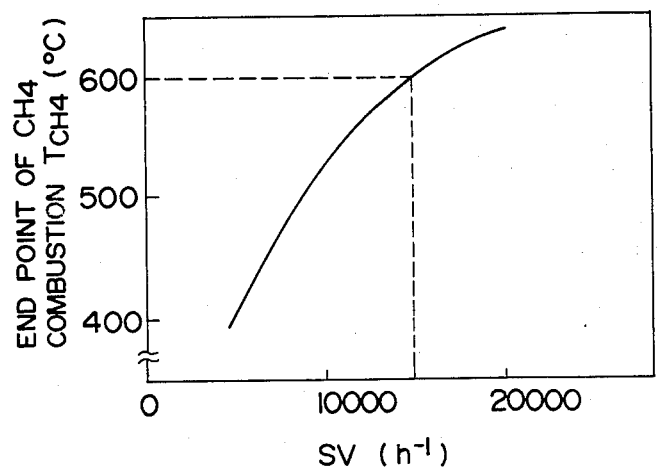
FIG. 4 is a graph showing a relationship between the space velocity of the waste gas composition and the combustion temperature of $CH_4$ ($T^E CH_4$)°C. in the step (b) of this invention.

FIG. 4 is a graph showing the relationship between the space velocity of the waste gas composition and the combustion temperature in the step (b).

Figure 5:
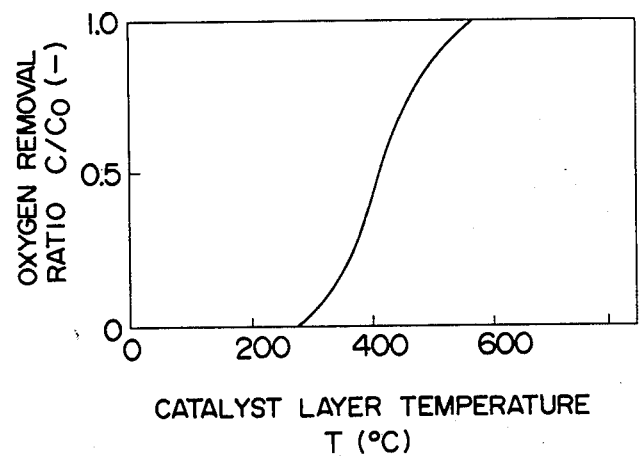
FIG. 5 is a graph showing a relationship between combustion temperature and removal of oxygen in the step (d) of this invention.

As is clear from FIG. 4, in order to combust the hydrocarbon completely at a space velocity of the waste gas composition above 15,000 $h^{-1}$, the catalyst layer temperature should be raised to above 600° C. However, when temperature in the layer of the catalytic combustor becomes above 600° C., the hydrocarbons are pyrolyzed to give carbon, which adheres to the catalyst layer, so that the catalytic activity is rapidly lowered. Therefore, for combusting the hydrocarbons efficiently, it is preferable to maintain the space velocity at 15,000 $h^{-1}$ or below and the combustion (catalyst layer) temperature at 600° C. or lower. In FIG. 5 is shown the relationship between combustion temperature and oxygen removal ratio in the steps (c) and (d) comprising adding an excess of a hydrocarbon to oxygen remaining in the waste gas composition and combusting the same. In FIG. 5, the symbol Co stands for the amount of oxygen gas contained in the waste gas composition, and the symbol C the amount of oxygen gas subjected to the combustion treatment.

In the steps (c) and (d), an excess of a hydrocarbon was added to the waste gas composition and the residual oxygen was removed at a space velocity of the waste gas composition of 15,000 $h^{-1}$ and at a combustion temperature in the range from 500° to 600° C. Since the combustion temperature increases with an increase of the carbon number of the hydrocarbon, the carbon number of 4 or less (n=4 or less in $C_nH_{2n+2}$) is preferable in order to control the combustion temperature at 600° C. or lower. As a result, the amount of the residual oxygen could be reduced to 1 ppm by weight or less.

The waste gas composition treated in the steps (a) to (d) in the manner described above was subjected to gas analysis. The results obtained are as shown in Table 4.

TABLE 4

| | (ppm by weight) | | |
|---|---|---|---|
| | $H_2$ | $O_2$ | $CH_4$ |
| Composition of gas | 1 > | 1 > | 1 < |

Next, the waste gas composition which has passed through the steps (a) to (d) was sent to the step (e) and subjected to the pressure swing adsorption treatment.

In the pressure swing adsorption treatment, an adsorption tower having a capacity of 20 liters was used, the adsorbing amount was adjusted to 2 to 6 kg/cm² in terms of gauge pressure, the desorption was conducted at atmospheric pressure, and the cycle time was adjusted to 135 to 270 seconds. As a result, the finally purified and recovered argon had a concentration of 99.9 to 99.999% by weight, and the recovery was 50 to 65% by weight. The amount of argon purified was 800 to 1,600 liters per unit time.

Further, the pressure swing adsorption treatment was carried out by conducting the desorption procedure by reducing, as shown in FIG. 3, the pressure inside the adsorption tower to 50 to 150 mmHg, with omission of the purge stage. As a result, the concentration of the recovered argon was 99.9 to 99.999% by weight, and the recovery was improved to 50 to 74% by weight.

As explained above, when the process or apparatus for purifying argon of this invention is employed, the steps are simplified because water and carbon dioxide are removed by the adsorption method; removal of oxygen, nitrogen and water becomes possible; and argon can be purified to a high concentration from a waste gas composition exhausted from a furnace using argon, in particular, a silicon furnace.

What is claimed is:

1. A method for producing a highly purified argon gas from an argon waste gas containing $H_2$, CO, $N_2$, $O_2$ and hydrocarbons as impurities, which comprises the steps of;
   (a) adding an oxygen gas to said argon waste gas in a stoichiometrically excess amount with respect to said $H_2$, CO and hydrocarbons;
   (b) contacting said waste gas incorporated with said excess amount of $O_2$ gas with a catalyst for oxidation reaction between $H_2$, CO and hydrocarbons and $O_2$ to covert $H_2$, CO and hydrocarbons into $H_2O$ and $CO_2$ so that respective amounts of $H_2$, CO and hydrocarbons in the thus treated gas are reduced to be less than 1 ppm by weight;
   (c) adding a $C_nH_{2n+2}$ gas to said treated gas in a stoichiometrically excess amount with respect to $O_2$ contained in said treated gas, wherein n is equal to 1 through 4;
   (d) contacting said treated gas incorporated with said $C_nH_{2n+2}$ gas with a catalyst for oxidation reaction between said $C_nH_{2n+2}$ and $O_2$ to convert said $CnH_{2n+2}$ into $CO_2$ and $H_2O$ so that an amount of $O_2$ in the resulting gas is reduced to be less than 1 ppm by weight; and
   (e) thereafter subjecting the resulting gas to a pressure swing adsorption-desorption method in order to remove $N_2$, said $C_nH_{2n+2}$ and $H_2O$ from the resulting gas, thereby to produce the highly-purified argon gas of a concentration of 99.99% by weight or more;
   said pressure swing adsorption-desorption method comprising
      (1) a first step of introducing said resulting gas into a first adsorption bed packed with an adsorbent selected from the group consisting of zeolite 5A, mordenite and a mixture thereof, each having an average micropore size of 5 angstroms under an elevated pressure at an ambient temperature, while a second adsorption bed packed with the adsorbent is in the stage of regeneration;
      (2) a second step of effecting desorption of the adsorbent in said first adsorption bed by reducing the pressure thereof at the ambient temperature, while the second adsorption bed is in the stage of adsorption;
      (3) a third step of regenerating the adsorbent in said first adsorption bed by letting the highly purified argon gas pass said first adsorption bed under the reduced pressure at the ambient temperature, while said second adsorption bed is in the stage of desorption; and
      (4) a fourth step of effecting adsorption in the first adsorption bed by contacting said resulting gas with said adsorbent under the same condition as in step (1), while said second adsorption bed is in the stage of regeneration.

2. A method for producing a highly purified argon gas from an argon waste gas containing $H_2$, CO, $N_2$, $O_2$ and hydrocarbons as impurities, which comprises the steps of;
- (a) adding an oxygen gas to said argon waste gas in a stoichiometrically excess amount with respect to said $H_2$, CO and hydrocarbons;
- (b) contacting said waste gas incorporated with $O_2$ gas with a catalyst for oxidation reaction between $H_2$, CO and hydrocarbons and $O_2$ to covert $H_2$, CO and hydrocarbons into $H_2O$ and $CO_2$ so that respective amounts of $H_2$, CO and hydrocarbons in the thus treated gas are reduced to be less than 1 ppm by weight;
- (c) adding a $C_nH_{2n+2}$ gas to said treated gas in a stiochiometrically excess amount with respect to $O_2$ contained in said treated gas, wherein n is equal to 1 through 4;
- (d) contacting said treated gas incorporated with said $C_nH_{2n+2}$ gas with a catalyst for oxidation reaction between said $C_nH_{2n+2}$ and $O_2$ to convert said $C_nH_{2n+2}$ into $CO_2$ and $H_2O$ so that an amount of $O_2$ in the resulting gas is reduced to be less than 1 ppm by weight; and
- (e) subjecting the resulting gas to a pressure swing adsorption-desorption method in order to remove $N_2$, said $C_nH_{2n+2}$ and $H_2O$ from the resulting gas, thereby to produce the highly purified argon gas of a concentration of 99.99% by weight or more;

said pressure swing adsorption-desorption method comprising
- (1) a first step of introducing said resulting gas into a first adsorption bed packed with an adsorbent selected from the group consisting of zeolite 5A, mordenite and a mixture thereof each having an average micropore size of 5 angstroms under an elevated pressure at an ambient temperature, while a second adsorption bed packed with the adsorbent is in the stage of desorption and a third adsorption bed packed with the adsorbent is in the stage of regeneration;
- (2) a second step of effecting desorption of the adsorbent in said first adsorption bed by reducing the pressure thereof at the ambient temperature, while the second adsorption bed is in the stage of regeneration and the third adsorption bed is in the stage of adsorption; and
- (3) a thrid step of regenerating the adsorbent in said first adsorption bed by letting the highly purified argon gas pass said first adsorption bed under the reduced pressure at the ambient temperature, while the second adsorption bed is in the stage of adsorption and the third adsorption bed in the stage of desorption, said first to third steps being repeated cyclically.

3. A process according to claim 1, wherein the catalyst used in the step (b) or the step (d) is at least one member selected from the group consisting of palladium, alumina, platinum and alloys thereof.

4. A process according to claim 1, wherein the space velocity of the waste gas composition in the step (b) is 15,000 hour$^{-1}$ or less.

5. A process according to claim 1, wherein the reaction temperature in the step (d) is 600° C. or lower.

6. A process according to claim 1, wherein the $C_nH_{2n+2}$ added in the step (c) is methane, ethane, or a mixture thereof.

7. A process according to claim 2, wherein the catalyst used in the step (b) or the step (d) is at least one member selected from the group consisting of palladium, alumina, platinum and alloys thereof.

8. A process according to claim 2, wherein the space velocity of the waste gas composition in the step (b) is 15,000 hour$^{-1}$ or less.

9. A process according to claim 2, wherein the reaction temperature in the step (d) is 600° C. or lower.

* * * * *